United States Patent [19]

Coronel

[11] 4,365,774
[45] Dec. 28, 1982

[54] CONVERTIBLE DELTA WING AIRCRAFT

[76] Inventor: Paul K. Coronel, P.O. Box 134, Kailua-Kona, Hi. 96730

[21] Appl. No.: 176,586

[22] Filed: Aug. 8, 1980

[51] Int. Cl.³ .......................... B64C 3/38; B64C 3/54
[52] U.S. Cl. ...................... 244/46; 244/218; 244/87; 244/216
[58] Field of Search .................. 244/13, 15, 212, 211, 244/213, 215, 216, 218, 219, 46, 87

[56] References Cited

U.S. PATENT DOCUMENTS

| | | | |
|---|---|---|---|
| 2,579,534 | 12/1951 | Anderson et al. | 244/216 |
| 2,661,166 | 12/1953 | Gordon | 244/216 |
| 3,447,761 | 6/1969 | Whitener et al. | 244/211 |
| 3,583,660 | 6/1971 | Hurkamp et al. | 244/212 |
| 4,025,007 | 5/1977 | Kamiut | 244/218 |
| 4,172,575 | 10/1979 | Cole | 244/215 |

FOREIGN PATENT DOCUMENTS

| | | | |
|---|---|---|---|
| 974146 | 2/1951 | France | 244/216 |
| 992365 | 10/1951 | France | 244/216 |

*Primary Examiner*—Galen L. Barefoot

[57] ABSTRACT

An airplane is disclosed which has a pair of fixed, outwardly extending delta wings extending laterally from a fuselage, a set of initial flaps pivotably attached to the rear of the fixed wings, a set of dependent flaps pivotably attached to the rear of the initial flaps, and a variable positionable concomitant stablizer located at the rear of the dependent flaps forming the rear of the delta wings during the high-speed configuration capable of achieving independence from the fixed wings upon actuation of the flap system; the above components all locked together to form the delta wing during high-speed flight with an actuator which also serves as a stress supporter for the flap system during its actuation.

10 Claims, 16 Drawing Figures

CONVERTIBLE DELTA WING AIRCRAFT

BACKGROUND OF THE INVENTION

1. Field of the Invention

The present invention relates to airplanes in general, and, in particular, to airplanes having particular wing features adapted so as to achieve an airfoil design convertible between high-lift and high-speed configurations.

2. Description of the Prior Art

In the art of aircraft and airfoil design the requirements of high-lift and low-drag are very often in conflict, particularly in airplanes designed for high-speed flight. Aircraft designed for flight at such high speeds are required to have low drag in order to obtain maximum efficiency in achieving such high speeds, but it is also desirous for such aircraft to have a capability for a relatively high amount of lift so that they can take-off and land with low speeds in relatively short distances. These conflicting objects have resulted in a wide variety of "compromise" wing designs which are designed to provide a significant amount of lift while reducing drag as much as possible, and have resulted in the designing of airplanes with variable pitch swept-back wings which may be pivoted toward and away from the aircraft fuselage to increase or decrease drag and lift alternatively. A variety of flap systems have been designed which retract into fixed wing aircraft, thus changing the wing chord length and thickness. These devices are extremely complicated, heavy, and are impractical for supersonic aircraft with thin wings requiring separate drag producing tail surfaces to maintain control of the aircraft during both high and low speed flight. Present delta shaped wings rely upon "incidental" or "compression" lift obtained in flight at high angles of attack to take off or land the aircraft with reduced speed.

The prior art is generally cognizant of the use of variable airfoils to help achieve greater lift in fixed wing aircraft. Thus, for example, U.S. Pat. No. 1,670,852, No. 2,112,154, and No. 3,179,354 disclose aircraft having wings which are, in some respect or another, changeable in their lift and/or drag configurations. Examples are also known, such as that shown in U.S. Pat. No. 1,913,169 of airfoil designs designed to enhance lift and the angle of attack of the aircraft wing to the airflow. Aircraft without tails are known such as the example of the tailless aircraft shown in U.S. Pat. No. 2,412,646. Fixed wing aircraft utilizing more than one flap to achieve high-lift are also known such as the examples shown in U.S. Pat. No. 3,853,289 and No. 4,117,996. No examples of delta wing aircraft with externally actuated multi-flap arrangements with multi-positionable concomitant stabilizers were seen in an extensive search of a number of sub-classes under class 244, Aeronautics.

SUMMARY OF THE INVENTION

The present invention is summarized in that an airplane includes a fuselage elongated along a longitudinal axis, a pair of "S" shaped delta wings fixed to the fuselage and extending outward on each side therefrom in a direction lateral to the longitudinal axis thereof, a vertical stabilizer with attached rudder located on top the rear of the fuselage, a pair of initial flaps attached to the rear of the fixed wings and a pair of dependent flaps attached to the rear of the initial flaps thereof, the two sets of flaps pivotably attached and located between the rear of the fixed wing and a multi-positionable concomitant stabilizer with attached elevons; the compound flap system being actuated with an actuator designed to lower both sets of flaps in a smooth progressive manner, the actuator arm also performing as the primary stress supporter for the lowered flaps while capable of locking all movable surfaces to each other and to the concomitant stabilizer during the high-speed configuration and providing a minimum of drag producing area into the airflow during high-speed flight; the concomitant stabilizer is located immediately to the rear of the dependent flap and forms the rear of the delta wings during high-speed flight, and achieves independence from the fixed wings and flap system upon actuation of the flap system, the stabilizer being also capable of tilting in an upward direction and traveling in a rearward direction in a manner to provide attached elevons access to an undisturbed airflow when the flaps are in the low-speed configuration, the rearward travel of the stabilizer also providing additional elevon control leverage when in the low-speed configuration; lateral control enhancement to the elevons being provided by spoilers attached to the upper surfaces of the fixed wings. Two sets of elevons, one set primarily for high speeds, and one set to operate with the high speed elevons at low speeds are also described.

It is an object of the present invention to construct an airplane which is capable of high-lift flight at low speeds and is also capable of low drag flight at high speeds.

It is an object of the present invention to achieve an airplane capable of both such objectives with a minimum number of surfaces entering the air stream during high-speed flight.

It is another object of the present invention to achieve an airplane capable of both such objectives with a minimum of manipulation of the airfoil surfaces.

It is yet another object of the present invention to provide an aircraft capable of achieving both such objectives in which the use of compromise airfoils particularly adapted for neither of the objectives is avoided.

It is an advantage of the present invention in that an aircraft may be constructed that will have both lower drag at high speeds and higher lift at low speeds than was heretofore possible to achieve in one aircraft.

It is another advantage of the present invention that the nature and simplicity of design of the proposed aircraft will allow for the construction of this aircraft capable of producing limited RADAR images when construction utilizes large amounts of modern synthetic materials.

It is an advantage of the present invention that the above effects are achieved with a minimum of drag producing surface area introduced into the airflow during high-speed flight.

Other objects, advantages, and features of the present invention will become apparent from the following specification.

DESCRIPTION OF THE PREFERRED EMBODIMENT

Shown in FIGS. 1-4 is an airplane generally indicated at 1 constructed in accordance with the present invention. The airplane 1 is formed around an elongated fuselage 5 located in the center of the aircraft and elongated along a longitudinal axis. The airplane 1 is bilaterally symmetrical about the longitudinal axis of the fuselage 5. Between the engine air intake 4 and the engine exhaust 15 are gas turbojet engines, one of which is located on each side of the fuselage 5 of aircraft 1. Placement of the engines is not limited to any type of engine or location. Alternative engine locations include placement anywhere on the aircraft. A tail structure formed at the rear of fuselage 5 is limited to an upright vertically extending vertical stabilizer 3 with attached pivotable rudder.

Extending generally laterally outward from the fuselage 5 on either side thereof in a symmetrical fashion are a pair of fixed "S" shaped delta wings 2 which are wider towards the rear of aircraft 1 than towards the front of the aircraft. Located on the upper surface of the fixed wings 2 are three spoilers 7. The purpose of these spoilers is to provide a means of enhancement of lateral control by the raising of the rear of the spoilers 7 causing a disruption of the airflow about the wing, causing a loss of the lift producing capacity of the wing resulting in the lowering of the said wing. This effect is especially important for control of the aircraft when the flap system is actuated, as will be discussed in greater detail later in this description.

Located immediately to the rear of wings 2 are a set of initial flaps 9. The flaps 9 have their leading edge attached to the trailing edge of the fixed wings 2 with flap pivot hinges 42 of FIGS. 9, 10 and 11. Located immediately to the rear of the initial flaps 9 are dependent flaps 10. The leading edge of the dependent flaps 10 are attached to the trailing edge of initial flaps 9 with flap pivot hinges 42 of FIGS. 9, 10 and 11. Each individual movable flap surface is attached to the trailing edge of the preceeding surface with a minimum of two hinges 42, and a maximum of more than two hinges 42. While airplane 1 is capable of being designed with two sets of flaps (initial and dependent) operating as a system located immediately in front of the concomitant stabilizer, airplane 1 is also capable of being designed with 1 set of initial flaps located between the fixed wing 2 and the concomitant stabilizer 11.

Figure 9:
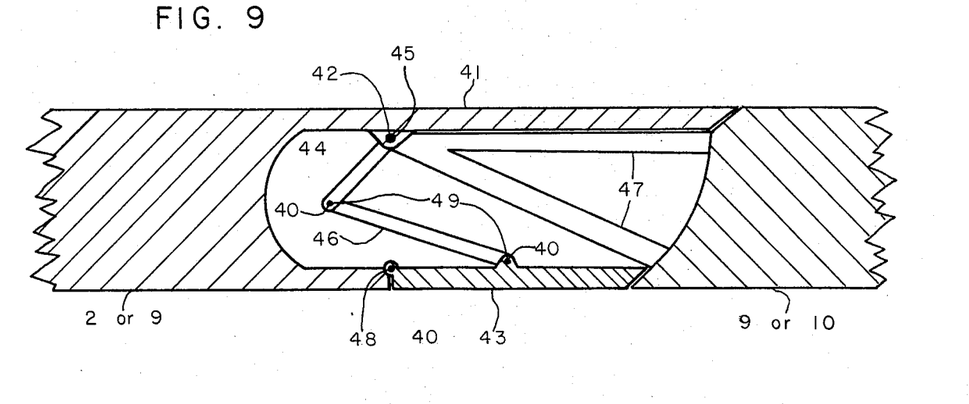
FIG. 9 is a side view of the wing slot actuation system located at the pivot point between the fixed wing and initial flap, and initial flap and dependent flap; the wing slot actuation system is in high-speed configuration.
Figure 10:
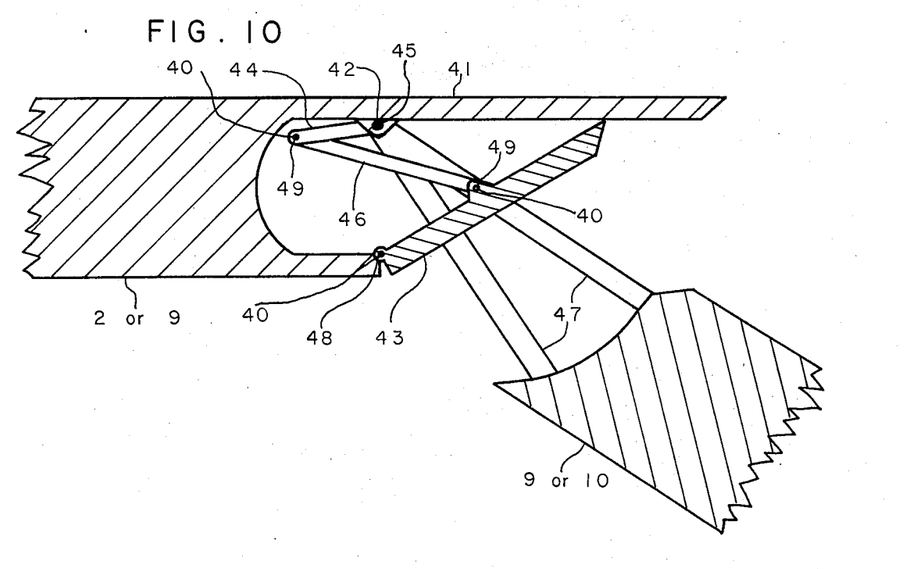
FIG. 10 is a side view of the wing slot actuation system in high-lift configuration.
Figure 11:
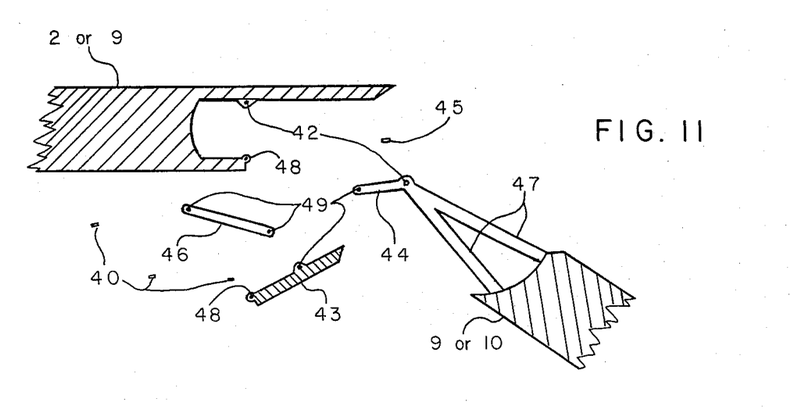
FIG. 11 is an exploded view of the functional components of the wing slot actuation system.
Figure 15:
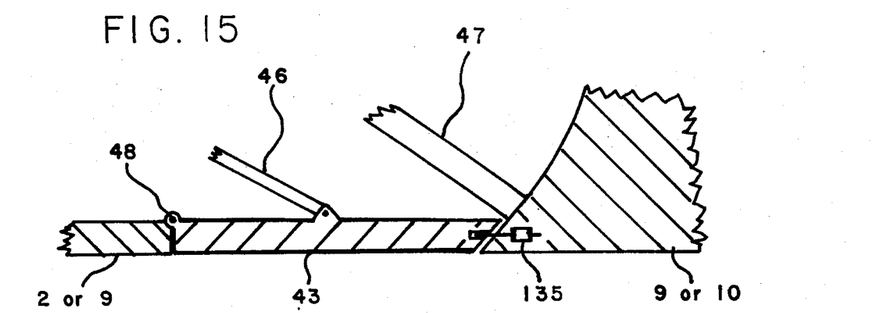
FIG. 15 is a side view of the slot door and its locking mechanism.

Referring now to FIGS. 9, 10 and 11, the top pivot of hinges 42 is fixed to the trailing edges of fixed wings 2 and initial flaps 9. The bottom of hinges 42 is attached to the flap support beams 47 which are attached to the leading edges of initial flaps 9 and dependent flaps 10. The top and bottom of hinges 42 are connected with hinge pins 45. Connected at an angle to flap support beams 47 is the slot door actuation arm 44. At one end of arm 44 is located a linkage pivot 49. Linkage pivot 49 of arm 44 is connected to the linkage pivot 49 of connecting linkage 46 with pivot pin 40. At the opposite end of connecting linkage 46 is located a linkage pivot 49 which is connected to the linkage pivot 49 of the slot door 46 with pivot pin 40. The flap door in turn is connected with flap door pivot 48 located on door 43 to flap door pivot 48 located on fixed wing 2 or initial flap 9 with pivot pin 40. In its operation, when the initial flap 9 and the dependent flap 10 are lowered, the lowering motion is transmitted through flap support beams 47 and in turn raises the slot door actuation arm 44 when the lowering motion is transmitted through the flap pivot hinge 42. The motion of the raising slot door actuation arm 44 in turn is transmitted through connecting linkage 46 to the slot door 43 causing the rear end of the slot door 43 to open while pivoting the front end of slot door 43 about flap door pivot 48. The upper wing surface of fixed wing 2 or initial flap 9 extends in a rearward direction beyond flap pivot hinge 42. The purpose of opening a slot door 43 between fixed wing 2 and initial flap 9, and initial flap 9 and dependent flap 10 is to provide for the advantages of "slotted flaps", or to allow a limited air flow from the bottom of a wing to flow to the upper surface enhancing a boundary layer air flow over the upper surface of the wing with lowered flaps, preventing the formation of lift reducing turbulent air flow. FIG. 15 shows the slot door locking mechanism. The mechanism consists of an electromagnetic or motorized lock. The mechanism is located within the initial and dependent flaps near the edge bordering the slot door. During its operation, the locking pin of mechanism 135 extends into the trailing edge of slot door 43 when the slot door is in its high speed closed position. Prior to the opening of the slot door during high lift operation, the locking pin of mechanism 135 is retracted into the initial or dependent flaps, freeing the slot door to open as required for its operation.

Figure 1:
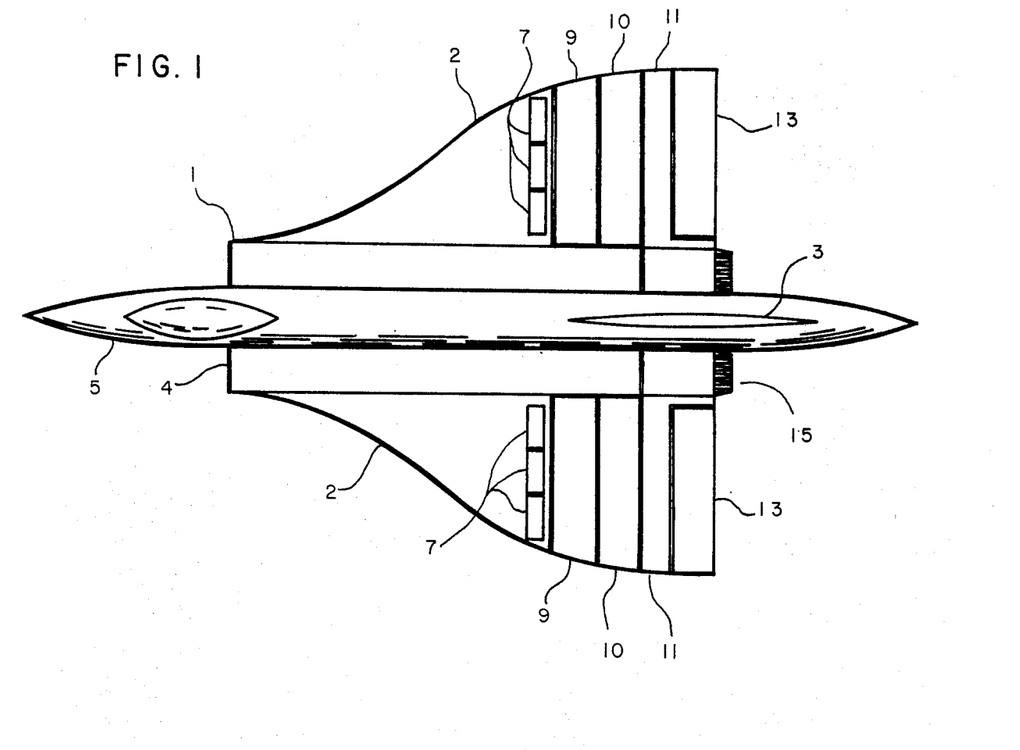
FIG. 1 is a top view of an airplane constructed in accordance with the present invention.
Figure 2:
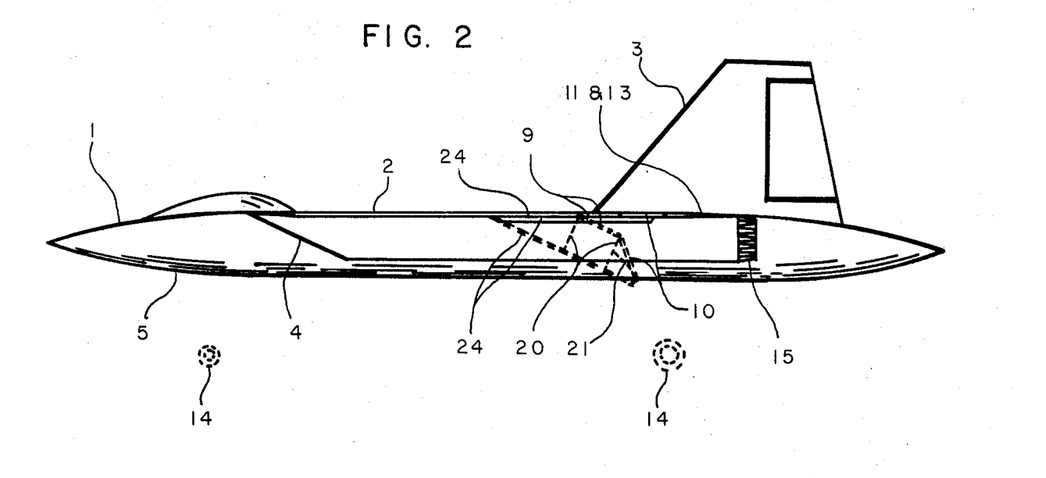
FIG. 2 is a side view of the airplane of FIG. 1 with the wings in the high-speed configuration; dotted lines indicating the secondary high-lift configuration of the wing flaps.
Figure 3:
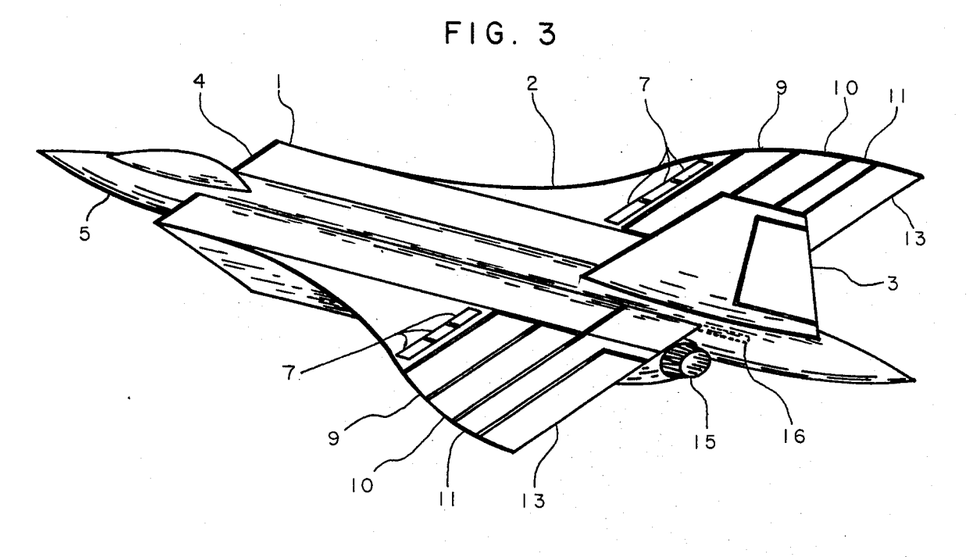
FIG. 3 is a perspective view of the airplane constructed in accordance with the present invention, the aircraft being in the high-speed configuration.
Figure 4:
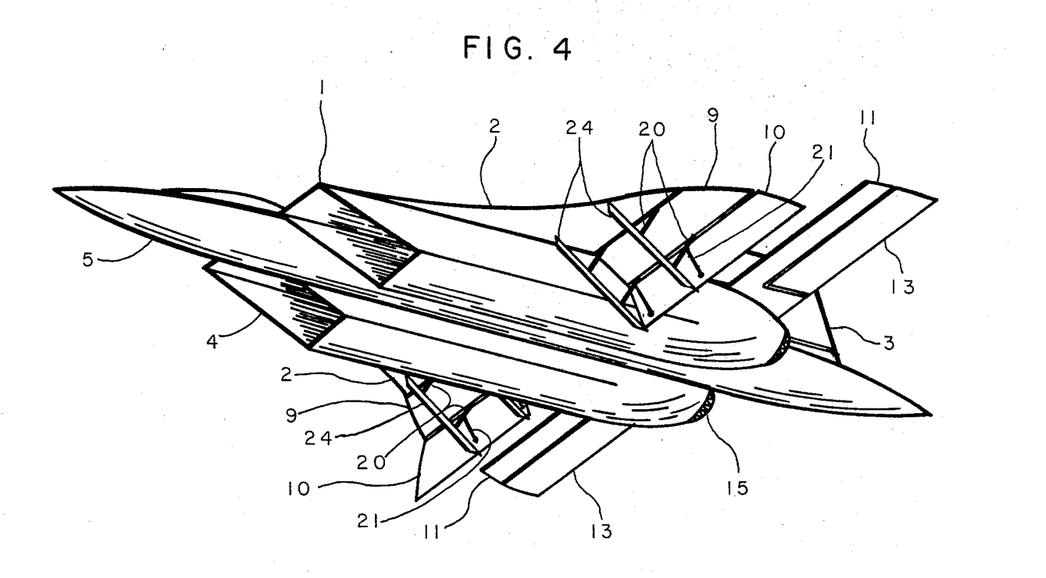
FIG. 4 is a perspective view of the airplane constructed in accordance with the present invention; the aircraft being in the high-lift configuration.
Figure 5:
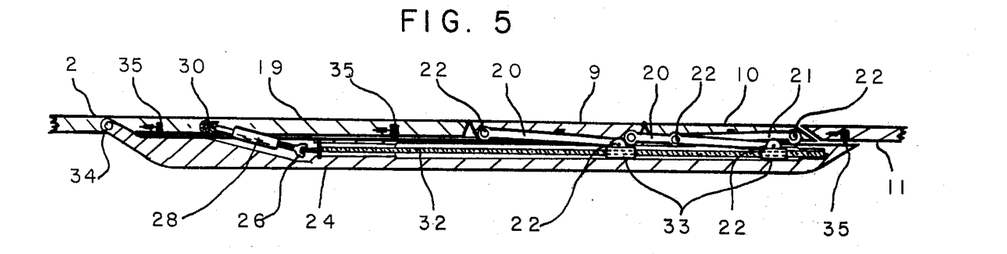
FIG. 5 is a side view of the operating apparatus of the wing flaps system of the airplane of FIGS. 1-4; the operating apparatus is in the high-speed configuration.
Figure 6:
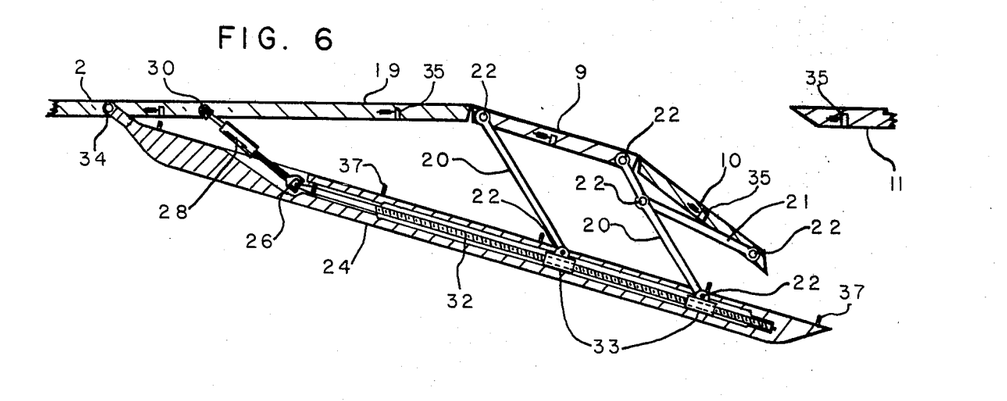
FIG. 6 is a side view of the operating apparatus of the wing flaps system in partial high-lift configuration.
Figure 7:
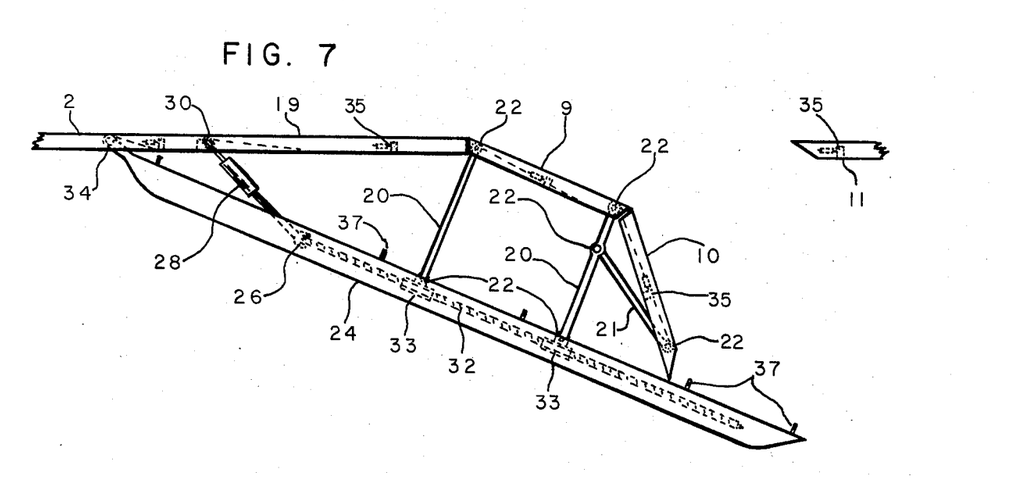
FIG. 7 is a side view of the operating apparatus of the wing flaps system in full high-lift configuration.

The initial and dependent flap systems are lowered and raised with the "Coronel" flap actuator generally indicated at 19 of FIGS. 5, 6 and 7. In its operation, drive gears 30 turn the telescoping propeller shaft 28 which transmits a rotating motion to drive screw 32 through universal joint 26. The rotating drive screw 32 in turn propels and drives forward the sliding support actuators 33. The sliding support actuators 33 are space a distance between them which equals the same distance between the two support pivots 22 located on the initial flap 9. Therefore, as sliding support actuators 33 are driven forward, the initial flap supports 20 are actuated to tilt in a parallel manner simultaneous lowering initial flap 9 in a parallel relationship to the concurrently lowering or downward tilting locking actuation support arm 24. The tilting of flaps supports 20 continues until the flap supports 20 achieve a 90° angle with the initial flap 9 and the locking actuation support arm 24 as seen in FIG. 7. Attached to the rear flap support 20 located between support pivot 22 and sliding support actuator 33 is a support pivot 22 attaching dependent flap support 21. The rear pivot 22 of dependent flap support 21 is attached to the rear end of dependent flap 10. As the rear flap support 20 is actuated to assist in the lowering of initial flap 9, an accompanying motion is transferred by the dependent flap support 21 to the dependent flap 10 resulting in the additional lowering of dependent flap 10. Thus in its operation, the locking actuation support arm 24 which is designed to present a minimum of drag producing surface area into the airflow at high speeds contains the drive mechanisms to progressively transmit a rotating motion in a manner which progressively lowers two individual sets of flaps which form a compound slotted flap system designed to enhance the lift producing capacity of the aircraft wings, and lower the angle of attack of the aircraft in flight by changing the wing chord angle of the wings when the flap system is deployed. In its operation, the airplane 1 is capable of two distinct modes of inflight operation corresponding to two distinct configurations of the wing systems, the main difference being in the configuration of the initial and dependent flaps 9 and 10, and the concomitant stabilizer with attached elevons 11 and 13. In either configuration, of course, power is provided by the engines. Thus, a first, high speed configuration is shown in FIGS. 1 and 3 in which the fixed wing 2, initial flap 9, dependent flap 10, and concomitant stabilizer 11 are locked together to form one wing unit producing minimum drag at high speeds. In contrast, as shown in FIG. 4, the initial flaps 9 and dependent flaps 10 are lowered and separated from the concomitant stabilizer 11 and perform the function of providing increased lift for aircraft 1 at reduced speeds while the concomitant stabilizer 11 and attached elevons, along with vertical stabilizer and attached rudder 3, and spoilers 7 perform the functions of stabilizing the aircraft 1 at low speeds. The control surfaces also stabilize the aircraft at high speeds when the fixed wing 2, initial flap 9, dependent flap 10, and concomitant stabilizer 11 are locked together in their high-speed configuration.

Figure 8:
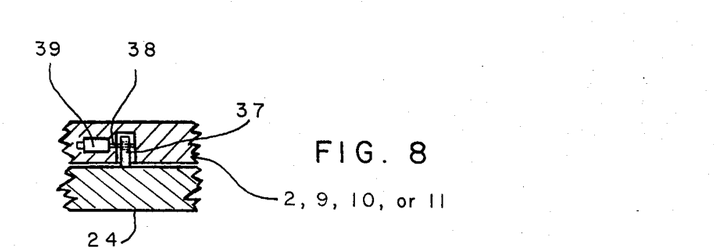
FIG. 8 is a side view of the locking mechanism which locks the operating apparatus of the wings flaps system to the wings, flaps, and concomitant stabilizer during high-speed operation.

Attached to the fixed wing 2, initial flap 9, dependent flap 10, and concomitant stabilizer 11 are locking mechanisms 35. As indicated in FIG. 8, these locking mechanisms contain an electromagnetic locking drive 39 which drives lock pin 38. In its operation, locking drives 39 push lock pins 38 through lock shafts 37 attached to locking actuation support arms 24 only when the locking actuation support arm 24 is in its full high-speed flight configuration as indicated in FIG. 5. The purpose of this locking system is to provide a rigid unit consisting of fixed wing 2, initial flap 9, dependent flap 10, and concomitant stabilizer 11 capable of withstanding shock and vibration of very high speeds.

Figure 12:
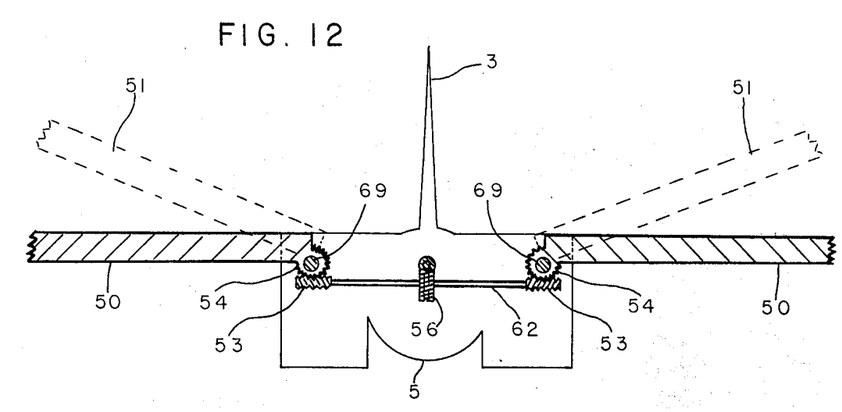
FIG. 12 is a schematic diagram of the operating apparatus of the concomitant stabilizer tilt system.
Figure 13:
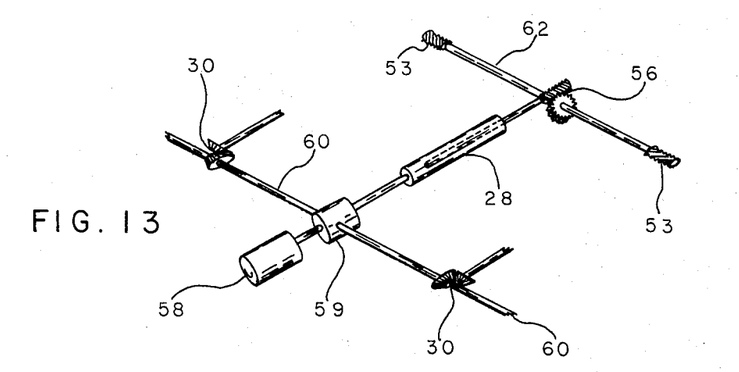
FIG. 13 is a schematic diagram of the drive system for the compound flap system and concomitant stabilizer drive system.
Figure 14:
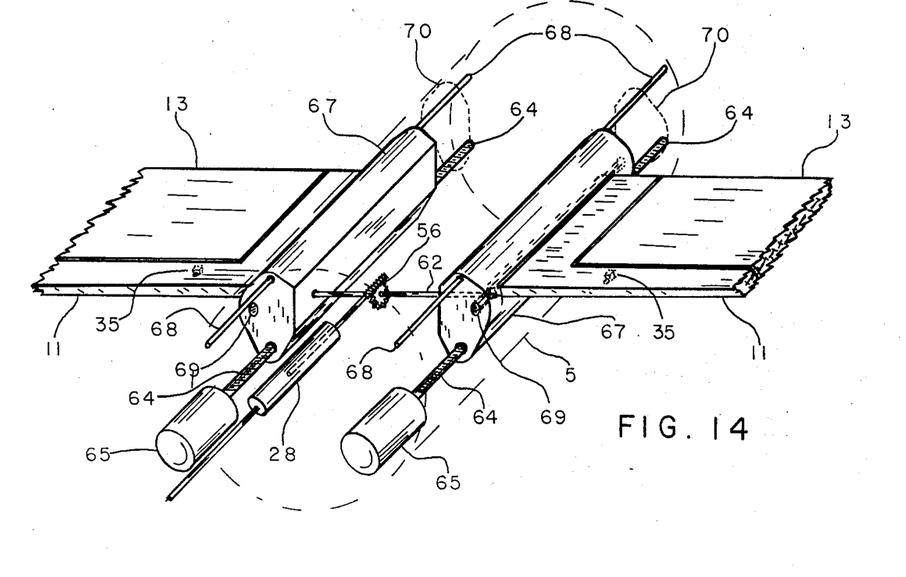
FIG. 14 is a perspective view of the drive system for the variable positionable concomitant stabilizer.

Located immediately to the rear of the dependent flaps 10 is the concomitant stabilizer 11 with attached elevons 13 as indicated in FIGS. 1-4. The leading edge of the concomitant stabilizer 11 is sharp and angles to the rear bottom as indicated in FIGS. 5-7. The purpose of this angle is to reduce leading edge drag with lowered flaps, and to accept the trailing edge of the raised dependent flap 10 during high speed-flight. The trailing edge of the dependent flap has a similar angle designed to mate with stabilizer leading edge when in high-speed configuration. The concomitant stabilizer also has the ability to tilt in a manner where the stabilizer wing tips are raised above the wing roots as indicated in FIG. 12. The actuation mechanism for the tilting systems consists of a drive screw 53 which rotates drive gear 54 which in turn is fixed to stabilizer 50 (No. 11 in other drawing figures) and connected to fuselage 5 with stabilizer tilt pivot 69. In its operation, the flap-stabilizer drive motor 58 of FIG. 13 provides rotary power to gear box 59. Gear box 59 transmits rotary power to flap actuator drive shafts 60 and telescoping propeller shaft 28. As the flap actuator drive shafts 60 transmit motion to the flap actuators, the telescoping propeller shaft drives reduction screw drive 56 which in turn drives stabilizer tilt drive screw 53, turning drive gear 54, raising stabilizers in their high speed position 50 to a new position 51. The purpose of tilting stabilizers is to provide the elevons access to an airflow undisturbed by the effect of the lowered flap system.

In addition to the ability of the concomitant stabilizer 11 to tilt upward, the concomitant stabilizer 11 is capable of traveling in a rearward direction. Number 16 of FIG. 3 indicates the rearward travel limit of concomitant stabilizer 11. In its operation, stabilizer positioning drive motors 65 turn drive screws 64 which in turn push tilting stabilizer variable positionable mounts 67 to any position between contact with the trailing edge of the dependent flap 10 to maximum rear travel limits 70. Stabilizer mount guide bars 68 provide for a stable travel track as well as an additional means for supporting the movable variable positionable mounts 67. Telescoping propeller shaft 28 allows power for the reduction screw drive 56 to be maintained during travel of the variable positionable mount 67. Locking mechanisms 35 allow the variable positionable concomitant stabilizer to be locked to the locking actuation support arm 24 of FIGS. 5-7, which in turn are locked to the dependent flaps 10, initial flaps 9, and fixed wings 2 during the high-speed flight configuration of the aircraft 1. The purpose of the longitudinal travel of the concomitant stabilizer is to provide additional control stability for the elevons attached to the concomitant stabilizer, primarily during low-speed, high-lift flight.

Figure 16:
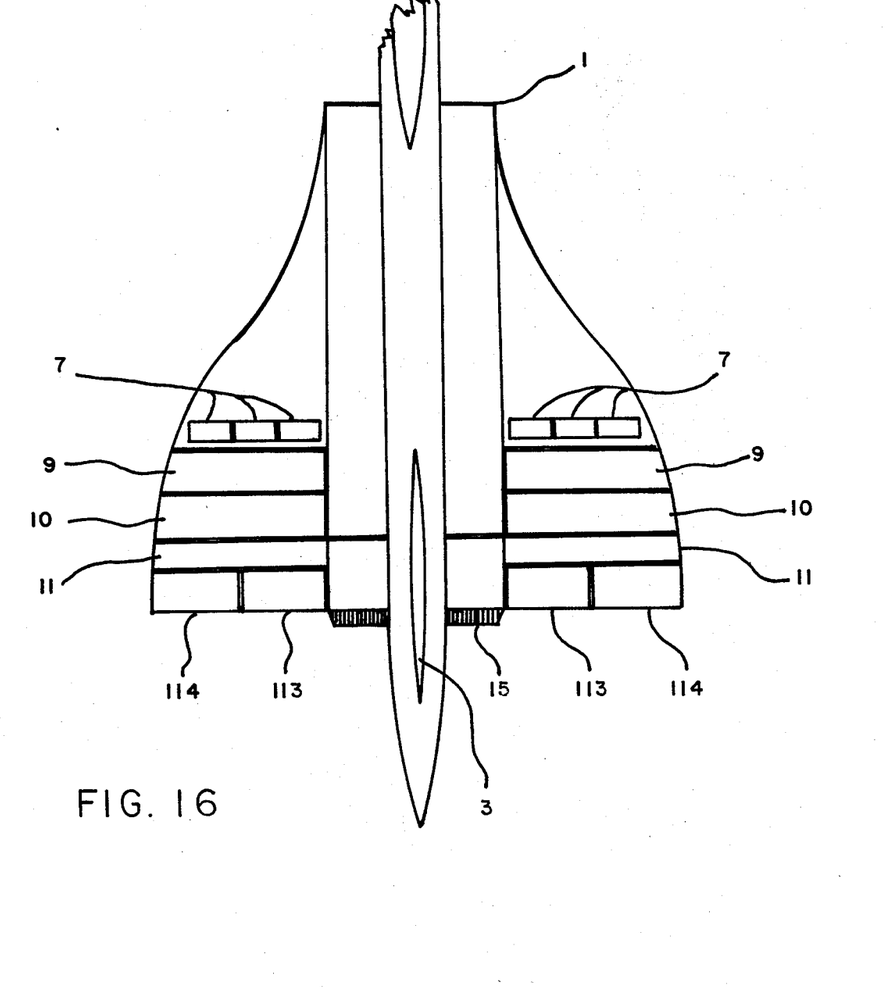
FIG. 16 is a top view of the aircraft constructed in accordance with the present invention with two sets of elevons, one set for high speed operation, and one set designed to operate in conjunction with the high speed set during low speed operation.

FIG. 16 shows the concomitant stabilizer with two sets of elevons 113 and 114. During the operation of the aircraft, one set of elevons is designed to operate during high speed flight operation. During low speed operation, both sets of elevons 113 and 114 function together as a unit to provide increased control to the aircraft during the low speed operation. The advantage of this configuration is to eliminate over-control from too much control surface during higher speeds, while providing sufficient control surface with resulting control during low speed operations.

The embodiment as shown in FIGS. 1-4 may be desirable in certain applications in which it is desired to achieve even more lift than is obtainable with the dual flap configuration. It is envisioned that as many additional flap elements as desired may be provided as desired for the particular application as long as each of those flap elements retract to produce one wing surface during the high-speed flight configuration.

It is further envisioned that the present invention may be utilized in a wide variety of aircraft having a wide assortment of wing shapes, airfoils and locations. The present invention may be used in conjunction with any known propulsion plant and it is one of the advantages of the present invention in that the propulsion plant may be located anywhere on the fuselage or wings of the airplane.

It is understood that the present invention is not limited to the particular construction and arrangement of parts disclosed and illustrated herein, but embraces all such modified forms thereof as come within the scope of the following claims.

I claim:

1. An aircraft with a compound flap system comprising of a set of initial flaps pivotably attached to the trailing edges of a set of fixed wings, a set of dependent flaps pivotably attached to the rear of the initial flaps, a concomitant stabilizer located immediately to the rear of the dependent flaps forming the rear portion of the wing during high-speed flight, and achieving independence and performing as a horizontal stabilizer during actuation of the flap system; the flap system including a means of creating slots between the fixed wing and initial flaps, initial flaps and dependent flaps; an operating mechanism of the flap system comprising parallel initial flap supports attached at one end to the initial flaps, and at the other end to an actuation arm pivotably attached to the fixed wings; the flap supports being actuated through the movement of sliding support actuators located within the actuation arm, the dependent flaps being connected to a rear flap support by a pivotably attached dependent flap support which lowers the dependent flap as the initial flap supports are lowered; the flap system being driven by a flap actuation mechanism utilizing a power source.

2. An aircraft with a flap system and concomitant stabilizer as claimed in claim 1 with a screw drive actuating the movement of the sliding support actuators.

3. An aircraft with a flap system and concomitant stabilizer as claimed in claim 2 with a concomitant stabilizer tilting system capable of tilting the stabilizer wing tips in a manner where the stabilizer wing tips are raised above the stabilizer wing roots.

4. An aircraft with a flap system and a concomitant stabilizer tilting system as claimed in claim 3 where the concomitant stabilizer tilting system is actuated with the use of a screw-gear drive mechanism.

5. An aircraft with a flap system and concomitant stabilizer as claimed in claim 4 where the concomitant stabilizer tilting system and the flap actuation mechanism are both actuated with a mechanical drive system powered by a common power motive drive source.

6. An aircraft with a flap system and concomitant stabilizer as claimed in claim 5 where the concomitant stabilizer is capable of longitudinal travel rearward of its high-speed position utilizing a longitudinal travel drive system capable of positioning the concomitant stabilizer at any location between its full retracted or full extended positions.

7. An aircraft with a flap system and concomitant stabilizer as claimed in claim 6 where the concomitant stabilizer longitudinal travel drive system consists of a motor powered screw drive system.

8. An aircraft with a flap system and concomitant stabilizer as claimed in claim 7 with locking support arms capable of locking the fixed wings, initial flaps, dependent flaps, and concomitant stabilizer into one rigid unit.

9. An aircraft with a flap system and concomitant stabilizer as claimed in claim 8 with the locking support arms pivotably attached to the fixed wing.

10. An aircraft with a flap system and concomitant stabilizer as claimed in claim 9 where the front end of the dependent flap supports are pivotably attached to the rear parallel initial flap supports, and the rear end of the dependent flap supports are pivotably attached to the bottom of the dependent flaps in a manner which progressively lowers the dependent flaps as the initial flaps are progressively lowered.

* * * * *